(12) United States Patent
Alavi

(10) Patent No.: US 8,286,910 B2
(45) Date of Patent: Oct. 16, 2012

(54) UNMANNED AIRCRAFT FOR TELECOMMUNICATIVE OR SCIENTIFIC PURPOSES

(76) Inventor: Kamal Alavi, Walchwil (CH)

( * ) Notice: Subject to any disclaimer, the term of this patent is extended or adjusted under 35 U.S.C. 154(b) by 964 days.

(21) Appl. No.: 12/160,119

(22) PCT Filed: Jul. 1, 2006

(86) PCT No.: PCT/EP2006/006409
§ 371 (c)(1),
(2), (4) Date: Oct. 13, 2008

(87) PCT Pub. No.: WO2007/079788
PCT Pub. Date: Jul. 19, 2007

(65) Prior Publication Data
US 2009/0189015 A1    Jul. 30, 2009

(30) Foreign Application Priority Data
Jan. 10, 2006  (CH) .................................... 0024/06

(51) Int. Cl.
*B64B 1/02*  (2006.01)
(52) U.S. Cl. ........................................................ 244/30
(58) Field of Classification Search ................ 244/24, 244/36, 96–99, 128, 94, 126, 30, 31
See application file for complete search history.

(56) References Cited

U.S. PATENT DOCUMENTS

| | | | | |
|---|---|---|---|---|
| 1,834,614 A * | 12/1931 | Hall | | 244/97 |
| 2,451,815 A * | 10/1948 | Donnell et al. | | 244/96 |
| 3,844,507 A * | 10/1974 | Papst | | 244/30 |
| 4,697,761 A * | 10/1987 | Long | | 244/62 |
| 5,348,254 A * | 9/1994 | Nakada | | 244/97 |
| 6,739,549 B2 * | 5/2004 | Senepart | | 244/24 |
| 7,156,342 B2 * | 1/2007 | Heaven et al. | | 244/30 |
| 2009/0314880 A1 * | 12/2009 | Rawdon et al. | | 244/30 |
| 2010/0230533 A1 * | 9/2010 | Greiner | | 244/97 |

* cited by examiner

*Primary Examiner* — Tien Dinh
(74) *Attorney, Agent, or Firm* — Brian Roffe

(57) ABSTRACT

Unmanned aircraft for telecommunicative or other scientific purposes, which is stationed at a determined height, in particular in the stratosphere. The aircraft includes a gas-filled balloon carrying a platform and equipment that maintains the platform in a position relative to the ground. The balloon carrying the platform is disposed in the interior of an external balloon of aerodynamical shape, particularly in the stratosphere. At least one low or high pressure insulation chamber filled with a medium is arranged between them and encircles the inner balloon. The medium used in the insulation chamber is a gas having a low thermal conductivity. The negative effects of the temperature differences are largely compensated so that the inner balloon can be produced from a lighter and cheaper material, thereby increasing durably its longevity.

20 Claims, 4 Drawing Sheets

UNMANNED AIRCRAFT FOR TELECOMMUNICATIVE OR SCIENTIFIC PURPOSES

FIELD OF THE INVENTION

The invention relates to an unmanned aircraft for telecommunications or other scientific purposes, to be stationed at a predetermined height in the stratosphere, that includes an outer balloon which is provided with an aerodynamic external shape, and a gas-filled balloon arranged inside the outer balloon, which in combination support a platform, and means for maintaining the position of the platform with respect to the Earth.

BACKGROUND OF THE INVENTION

The use of gas-filled pressurised balloons to station diverse telecommunications and/or surveillance platforms in the stratosphere is known, for example, from U.S. Pat. No. 5,104,059. One particular problem of such pressurised balloons arises from the variations in temperature to which they are exposed, firstly throughout the day and secondly at night. In the daytime, the balloon's surface is exposed to direct solar radiation, and the gas in the balloon's interior is heated by the solar radiation, causing the gas pressure to rise. At night, on the other hand, both ambient and gas temperatures fall and therefore also the gas pressure in the pressurised balloon. This imposes even more demands on the material and the construction of the pressurised balloon. It also makes it more difficult to maintain the platform's altitude and position with respect to the earth.

OBJECTS AND SUMMARY OF THE INVENTION

The present invention is based on the problem of creating an unmanned aircraft of the aforementioned type in which the gas-filled pressurised balloon supporting the platform can be kept at the desired altitude and position in optimal fashion, and additionally has a long lifetime.

This problem is solved according to the invention by an aircraft wherein between the outer balloon and the inner balloon, at least one low- or high-pressure insulating chamber is formed, where a low thermal conductivity gas is used as medium for the insulation chamber(s).

Further preferred embodiments of the aircraft according to the invention form the subject matter of the dependent claims.

In the aircraft according to the invention, in which the pressurised balloon is arranged inside an outer balloon which inflates in the stratosphere into an aerodynamic external shape, and in which at least one low or high-pressure insulation chamber filled with a medium is formed between this outer balloon and the inner balloon, the medium used for the insulation chamber being a gas with low thermal conductivity, the negative effects of the temperature variations on the gas pressure in the pressurised balloon are largely avoided, so that it can be produced from a lighter and cheaper material, and its lifetime is durably increased.

The platform's position with respect to the earth can be kept as stable as possible over long periods due to the largely constant gas pressure in the pressurised balloon and the electrically-driven propellers outside the outer balloon.

BRIEF DESCRIPTION OF THE DRAWINGS

The invention will next be explained in more detail with the aid of the drawings, which show in purely diagrammatic form.

DETAILED DESCRIPTION OF THE INVENTION

Figure 1:
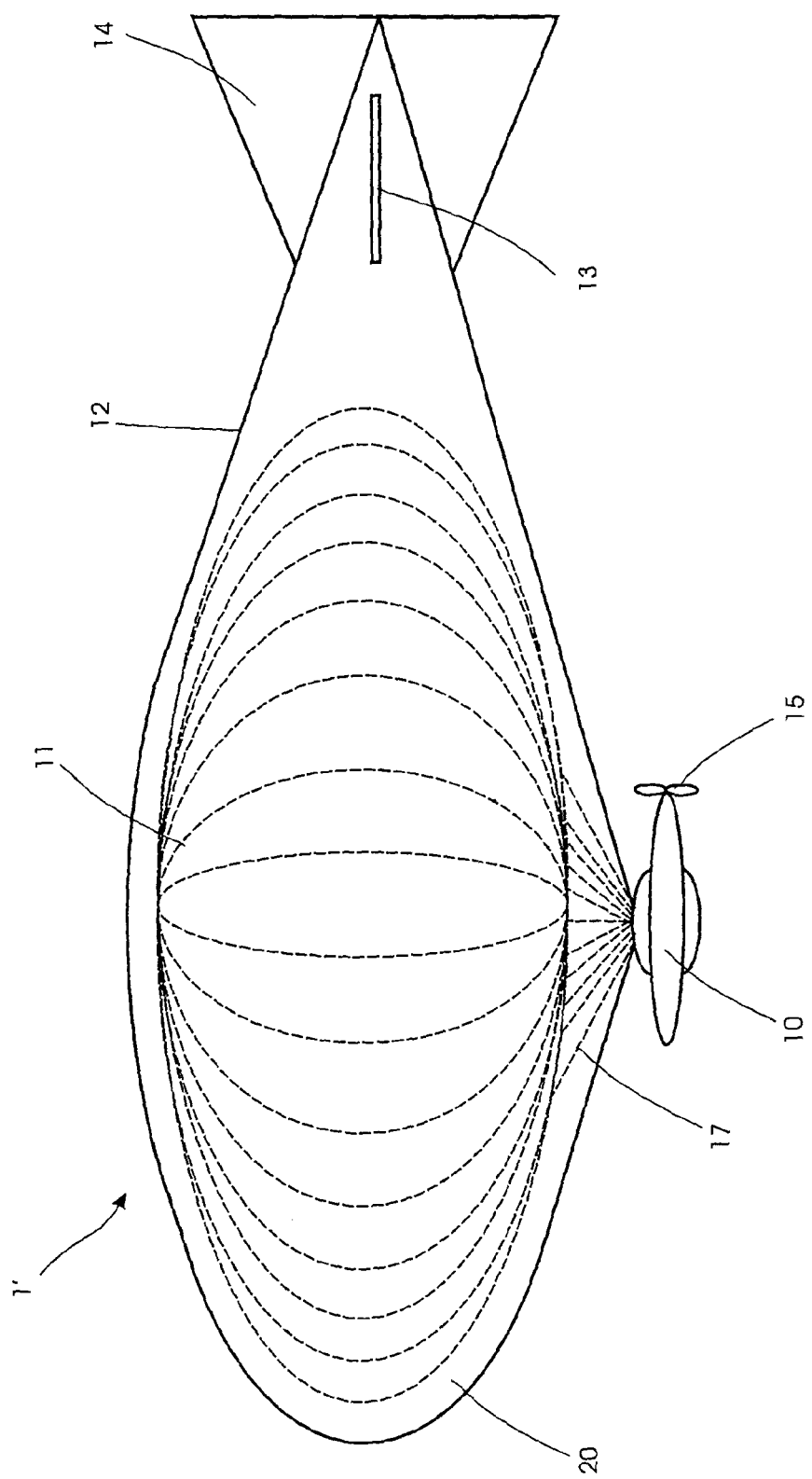
FIG. 1 is a first embodiment of an aircraft according to the invention in lateral view.

FIG. 1 is a schematic view of an unmanned aircraft 1, in particular a platform 10 for wireless communication and/or for other scientific purposes, a so-called "high altitude platform", in the stratosphere. This aircraft 1 can hereby be controlled in such a way that it adopts a stationary position with respect to the earth or it can also be arranged to be movable relative to the earth, if for example it is to be positioned flying stationary with respect to a satellite in space. This aircraft is suitable, not only as a transmission station for telecommunications, but also for scientific measurement purposes, as a transmission station for TV or radio stations, for photographic purposes, as a weather station and much more. It is equipped with a GPS and other control devices, so that automatic on-board guidance of the aircraft is enabled, with an electronic connection more or less remotely controlled by a control centre on earth.

According to FIG. 1, the aircraft 1 is already at the desired altitude of 20 to 30 km, which is advantageous in terms of wind conditions. The platform 10, equipped with corresponding devices ("payload plane") is supported by a pressurised balloon 11 filled with gas, preferably helium. As a variant, it is possible for this platform 10 to be supported by support elements 17 extending around the balloon 11, for example belts or suchlike.

The pressurised balloon 11, which advantageously takes the form of a pumpkin or other shape ("pumpkin balloon") sits within an outer balloon 12 which has an aerodynamic outer form, which is filled with a medium and inflated into the aerodynamic outer form only once the platform 10 has been brought through the troposphere with ease by means of the pressurised balloon 11 to the desired altitude, in particular of 20.7 km.

The outer balloon 12 is equipped at its rear end with an elevator and rudder unit 13, 14. There are also means to maintain the position of the aircraft and the platform with respect to the rotating earth. These include electrically-drivable propellers 15 for the forward propulsion of the aircraft or also for aircraft stabilisation, located outside the platform 10. In this case, the propellers 15 can be driven at individual speeds, in order always to keep the aircraft in the same axis with respect to the surface of the earth. The propellers 15 can also be disposed pivotably on the platform 10 and thus serve both said purposes. The aircraft 1 according to the invention is also equipped with a controller and with an electronic autopilot system.

According to the invention, the medium used for filling and inflating the outer balloon 12 is a gas with low thermal conductivity, preferably xenon or krypton. The thermal conductivity of krypton is 0.00949 W/m·K, and that of xenon 0.00569 W/m·K. A low- or high-pressure insulation chamber 20 is formed about the inner balloon 11, by which the balloon 11 is, so to speak, protected from the temperature differentials which arise for example during the night and in the daytime and its temperature and gas pressure respectively remain as constant as possible.

Figure 2:
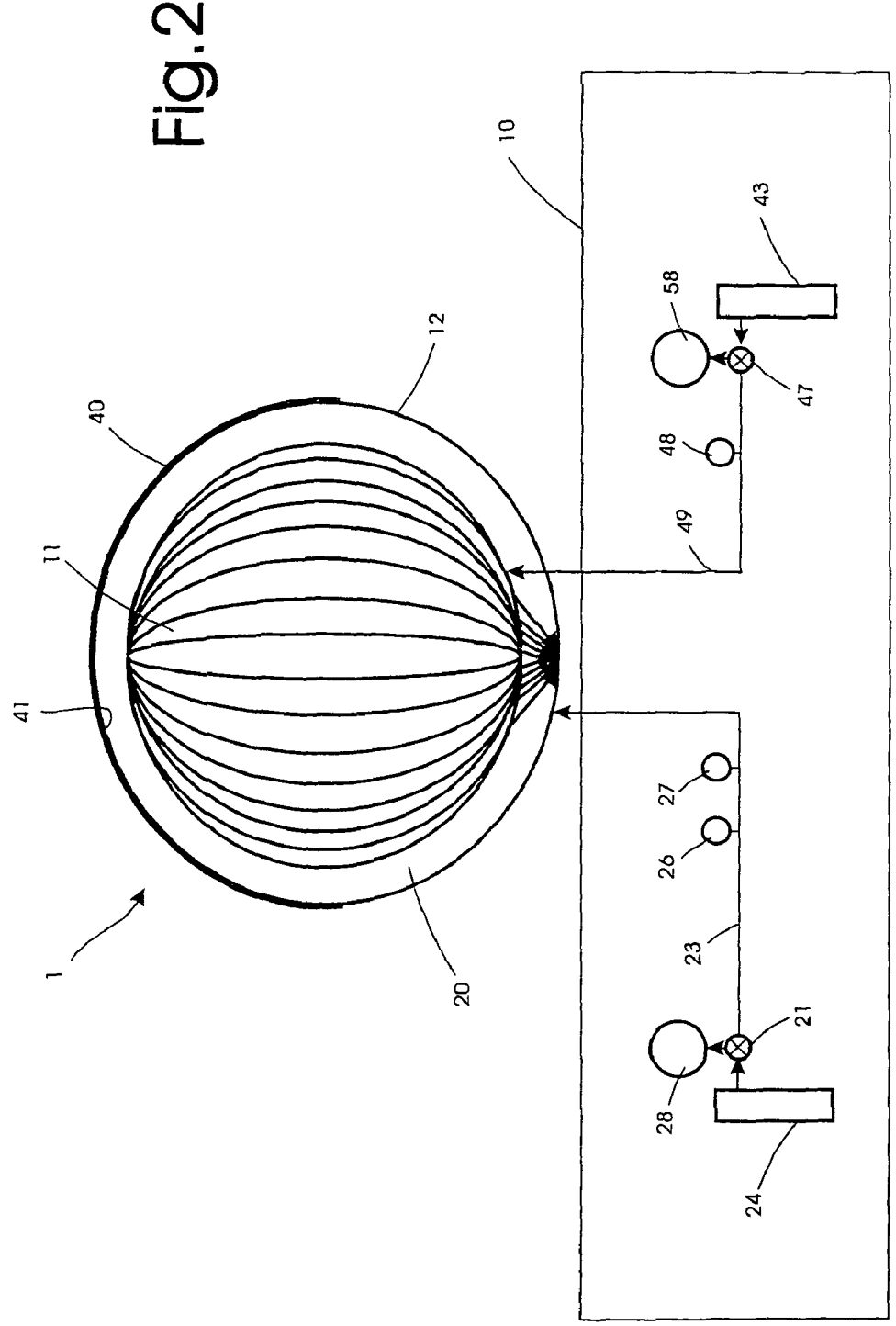
FIG. 2 is a part of the aircraft according to FIG. 1 in cross-section.

The gas which is notable for being a poor thermal conductor, preferably xenon or krypton, is delivered according to FIG. 2 by means of a pump 21 from a tank 24 via a feed line 23 into the insulation chamber 20, where the pump 21 also enables the gas to be fed into a separate balloon 28 forming a compensation chamber, which ensures constant pressure and constant volume in the low- or high pressure insulation chamber 20 and thus also maintains the aerodynamic outer form of the outer balloon 12. The gas is cleared of any moisture before going into the insulation chamber 20. A pressure and a temperature gauge 26 and 27 respectively are also provided, which are connected with a control unit, not shown in more detail. The inner balloon 11 is—as already mentioned—preferably filled with helium (but this could also be a different gas, e.g. hydrogen). According to FIG. 2, a helium tank 43 is linked via a pipe 49 with the interior of the balloon 11. A pump 47 allows the helium to be fed either into this pressurised balloon 11 or into an additional helium-filled balloon 58 serving as compensation chamber for the whole aircraft. A pressure gauge 48 which can deliver a signal to the control unit is also provided in the pipe 49. The helium is delivered under pressure into the inner balloon 11 supporting the platform 10, for which a compressor, not shown in more detail, is provided.

As can be seen from FIG. 2, all the equipment is contained in the platform 10. Obviously, additional instruments and aggregates, not shown in more detail, are also housed in this platform 10, for example all the electronics, accumulators, control devices and much more.

According to the invention, the pressure conditions in the inner balloon 11 are controlled such that the temperature in its interior remains as constant as possible and preferably corresponds to the night temperature of the outside air. The insulation chamber 20 filled with a low thermal conductivity gas ensures that the temperature differentials of the outside air during the day and at night have as little effect as possible on the inner balloon 11. If, however, the pressure gauge 48 detects a rise in pressure in the balloon 11 during the day, some of the helium is allowed to escape into the additional balloon 58 via a pressure reducing valve. At night, on the other hand, if the pressure gauge 48 displays a pressure below the desired value, the helium is pumped back into the inner balloon 11.

The outer balloon 12, the base material of which is polyethylene, is provided on its surface with a solar collector film 40. The electrical energy produced during the day by solar radiation is stored by batteries.

The outer balloon 12 is also provided with an infrared collector film 41, with which the infrared re-radiation from the earth during the night is exploited. The infrared collector film 41 on the inner side of the solar collector film 40 is preferably made of a dark, approximately 12 µm thick aluminium film, a colour coat or similar. Both the outer balloon 12 and the pressurised balloon 11 are advantageously made from a transparent plastic material, with the infrared collector film 41 being attached on the inner side of the outer balloon 12 facing towards the earth. The infrared radiation can then penetrate through both balloons from below and so helps to compensate, in temperature terms, for the cooling which otherwise occurs during the night. The infrared collector film 41 preferably covers a larger area of the outer balloon 12 than the solar collector film 40.

Both on the outside and the inside, the solar collector film 40 and the infrared collector film 41 are covered by a layer of synthetic foam, for example polystyrene, or by another insulation material, so that no excessive heating of the balloon surface occurs.

It is, however, also possible to produce both the outer balloon 12 and the inner balloon 11 from an aluminised plastic, this being a multilayer material, in which a layer of aluminium is applied to a plastic, preferably polyethylene, base, said aluminium layer being in turn covered by a layer of plastic. The aluminium layer firstly effects a reflection of radiation and secondly improves the properties relating to gas impermeability, i.e. less gas can escape through the balloon material. Due to the reflection of radiation, its thermal effect, which is intended to be "shielded" by the insulation chamber, is reduced. A solar collector film can, in turn, be attached on the surface of the outer balloon or an area thereof.

It would certainly be possible to form two low or high-pressure insulation chambers around the inner balloon 11, in that the outer balloon would have an outer sheath and an inner sheath between which the one, first insulation chamber, preferably filled with xenon or krypton, would be formed. The other low- or high-pressure insulation chamber formed between the inner sheath and the balloon could then be filled with outside air and the air could be released from the insulation chamber via an outflow, in order to keep the pressure constant in this chamber. Accordingly, the pressure and also the height above sea level could then be measured and transmitted to the control unit.

Figure 3:
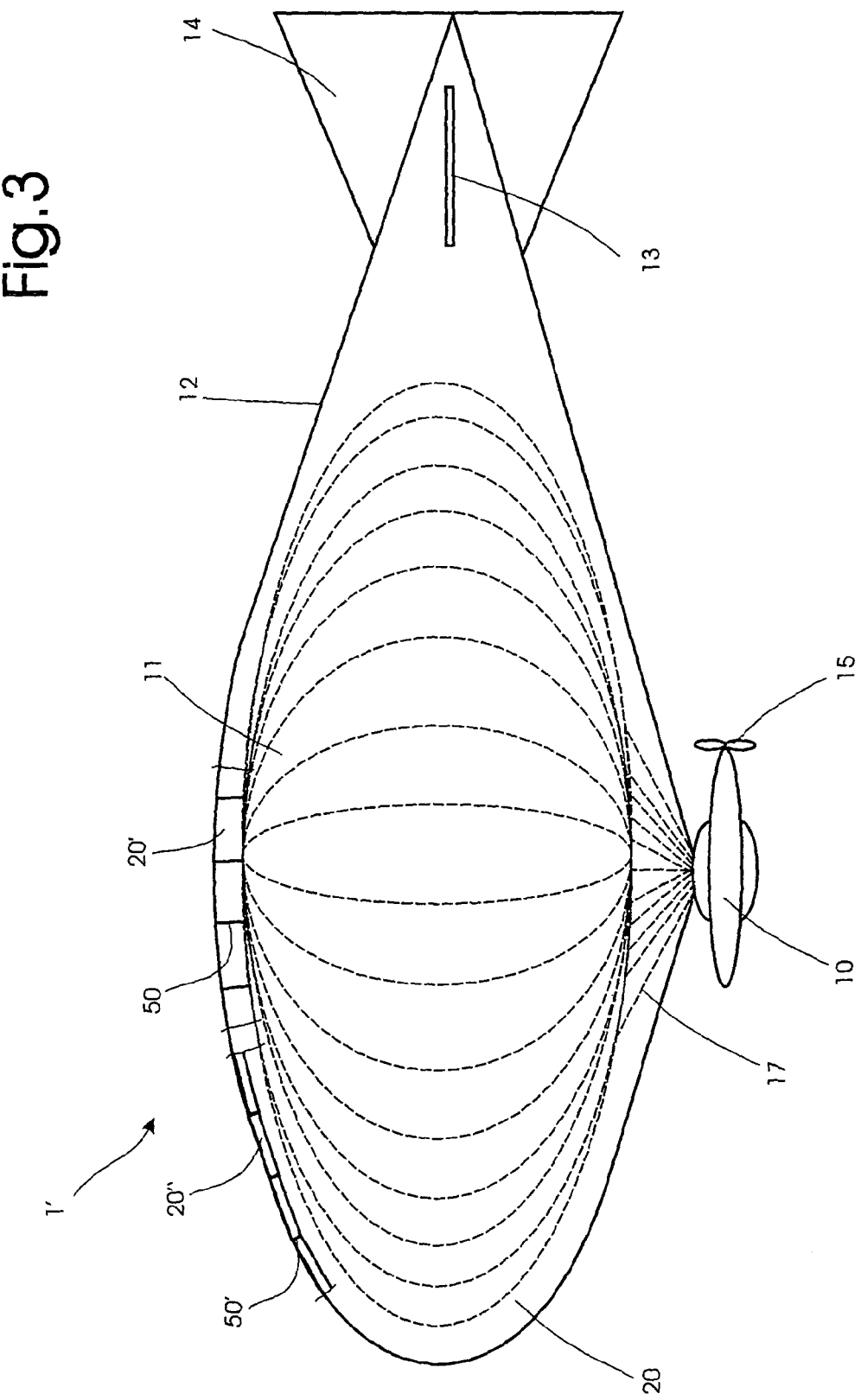
FIG. 3 is a second embodiment of an aircraft according to the invention in lateral view.

Two further possible embodiments of the aircraft 1' according to the invention are indicated in FIG. 3.

In these variants, firstly, a chamber 20' arranged between the inner perimeter of the outer balloon 12 and the outer perimeter of the balloon 11 and extending helically around the balloon is shown, which is delimited by transversal sections 50.

Secondly, a chamber 20" arranged at the inner perimeter of the outer balloon 12, again helical, extending around the balloon 11 at a distance, can be formed, which is made from one or more envelopes 50' with an approximately rectangular cross-section.

In both cases, these chambers 20', 20" are filled with a gas, for example xenon or krypton, with a low thermal conductivity and thus the low- or high-pressure insulation chamber is formed at least partially around the balloon 11.

These chambers 20', 20" are only shown over part of the entire perimeter of the balloon. Obviously, either one or other chamber would be provided over the entire, or almost the entire, perimeter.

Similarly to the variants according to FIG. 1 or 2, the outer balloon 12 can in turn be provided with the solar collector film and the infrared collector film with which the solar radiation during the day and the infrared re-radiation from the earth at night are energetically exploited. In turn, the transversal sections 50 of these envelopes 50 or 50' preferably then advantageously consist—as with the two balloons 11, 12—of a transparent plastic material.

In the case of the embodiments indicated in FIG. 3, however, both the outer balloon and the inner balloon 11 could be made from an aluminised plastic.

A further possibility lies in the arranging, instead of helical chambers 20, 20", of a number of connected pocket- or cushion-shaped chambers which could be filled with a gas having low thermal conductivity, preferably xenon or krypton, around the balloon 11, over its entire perimeter or at least over most of it. These could in turn at least partially fill the space between the inner balloon 11 and the outer balloon 12 or be arranged on the inner perimeter of the outer balloon 12, at a distance from the inner balloon 11. A suitable material for these pocket- or cushion-shaped chambers is the aluminised plastic already mentioned, preferably polyethylene.

Since the gas pressure in the balloon 11 of the aircraft 1 or 1' according to the invention is kept largely constant and/or can be effectively regulated and is not exposed to the extreme day/night temperature differentials, the aircraft can remain in operation for substantially longer, and can better maintain its position with respect to the earth (or with respect to a specific area on the earth) than is the case with ordinary balloons.

The aircraft 1 is obviously equipped with a complete control system, so that it automatically places itself in the desired position with respect to the surface of the earth. It is also linked to a control centre on earth, so that data transfer and control options can be conducted from the earth.

Figure 4:
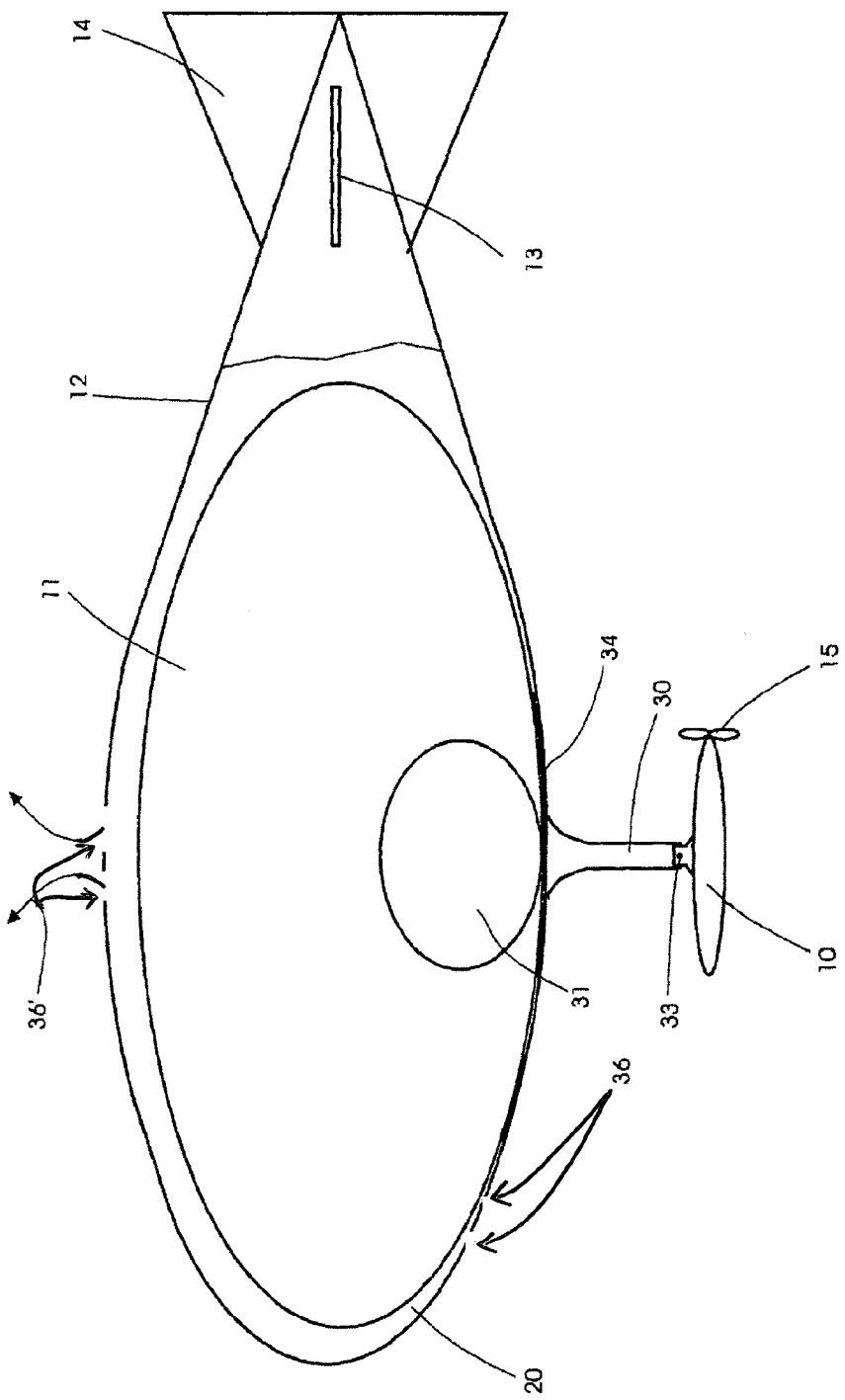
FIG. 4 is a further variant of an aircraft according to the invention in diagrammatic longitudinal section and partially in plan view.

FIG. 4 shows an unmanned aircraft which is designed, per se, identically to that in FIG. 1. For the unaltered parts, therefore, the same reference numbers are used. The outer balloon 12 and the gas-filled balloon 11 arranged inside this, supporting the platform, are present. In the inner balloon 11 there is at least one additional balloon 31 with an inlet and an outlet valve for letting gas in or out, preferably air. With this additional balloon 31, a constant pressure is generated in the balloon 11 enveloping it. To this end, a corresponding pressure regulator is provided in the balloon 31, not shown in more detail, in which a pressure measurement is taken in the inner balloon 11. The air can be let out of the additional balloon 31 by means of a controllable outlet or inlet valve or let in via a pump, with the result that the pressure in the inner balloon 11 is kept constant or can be adjusted as required.

As a further feature of the invention, the inner balloon 11 and the outer balloon 12 are held together on their underside by connecting means 34. This produces optimal stability of the aircraft. Also, the additional balloon 31 in the inner balloon 11 is also attached to the latter on its underside. Advantageously, on the underside of the outer balloon, an anodised aluminium layer is provided as outer sheath with which the infrared radiation is intended to be absorbed at night, in order to generate heat in the insulation chamber.

The platform 10 is connected, within the scope of the invention, by a connecting element 30 with the underside of the outer balloon 12. The platform 10 is hereby articulated by a link 33, indicated, to the outer balloon 12 and detachable from this outer balloon by a coupling, not shown in more detail. As already mentioned, this allows the platform 10 to be brought back to earth following decoupling, while the balloons rise and are destroyed. Advantageously, an electromagnetic coupling is used, enabling release without expensive mechanical devices.

It is also shown that, for the purpose of gas circulation, the insulation chamber 20 on the underside of the outer balloon 12 is provided with one or more inlets 36 and on the upper side with one or more outlets 36'. This allows optimal cooling of the aircraft during the day.

The invention claimed is:

1. Unmanned aircraft stationable at a pre-determined altitude in the stratosphere, comprising:
    a platform for telecommunications equipment or scientific equipment,
    an outer balloon having an aerodynamic external shape at least when present in the stratosphere,
    a pressurizable inner balloon fillable with gas, the outer and inner balloons supporting the platform, the inner balloon being arranged inside the outer balloon such that the outer balloon forms at least one insulating chamber around the inner balloon,
    circulation means for circulating gas through the at least one insulating chamber,
    at least one additional balloon arranged inside the inner balloon, the at least one additional balloon being attached on its underside to the inner balloon and configured such that an amount of gas in the at least one additional balloon is controllable to enable the inner balloon to be maintained at a constant pressure,
    connecting means for connecting an underside of the inner balloon to an underside of the outer balloon, and
    position maintaining means for maintaining the position of the platform with respect to the Earth.

2. Aircraft according to claim 1, wherein the gas for the at least one insulating chamber is air, xenon and/or krypton.

3. Aircraft according to claim 1, wherein the at least one insulation chamber extends helically around the inner balloon and is delimited by transversal sections running between the inner balloon and the outer balloon.

4. Aircraft according to claim 1, wherein the at least one insulation chamber is arranged on an inner perimeter of the outer balloon, runs helically and at a distance from the inner balloon and is formed by one or more envelopes approximately rectangular in cross-section.

5. Aircraft according to claim 1, further comprising interconnected pocket- or cushion-shaped insulation chambers arranged around the inner balloon, which at least partially fill a space between the inner balloon and the outer balloon or are arranged at a distance from the inner balloon on an inner perimeter of the outer balloon.

6. Aircraft according to claim 1, further comprising an additional insulation chamber between the inner balloon and the at least one insulation chamber, the additional insulation chamber being arranged to contain outside air.

7. Aircraft according to claim 1, further comprising a solar collector film arranged on an outer surface of the outer balloon and an additional plastic layer applied to the solar collector film as a heat shield.

8. Aircraft according to claim 7, wherein the outer balloon includes an elevator or rudder unit, the solar collector film being arranged on the elevator or rudder unit, and the additional plastic layer constituting the heat shield being a layer of foam or a different insulating material.

9. Aircraft according to claim 1, further comprising an infrared collector film arranged in connection with the outer balloon.

10. Aircraft according to claim 9, wherein the infrared collector film covers a larger area of the outer balloon than the solar collector film.

11. Aircraft according to claim 9, wherein both the inner balloon and the outer balloon are made from a transparent material, and the infrared collector film is applied on the inside of the outer balloon facing downward.

12. Aircraft according to claim 1, wherein both the inner balloon and the outer balloon are made from a multilayer plastic, in which an aluminum layer is applied onto a plastic base.

13. Aircraft according to claim 1, wherein the outer balloon is functionally connected with an additional balloon forming a compensation chamber and fillable with a low thermal conductivity gas.

14. Aircraft according to claim 1, wherein the inner balloon is functionally connected with an additional balloon forming a compensation chamber and fillable with the same gas, via which the pressure in the inner balloon is adjustable.

15. Aircraft according to claim 1, further comprising at least one inlet to the at least one insulating chamber on an underside of the outer balloon and at least one outlet to the at least one insulating chamber on an upper side of the outer balloon.

16. Aircraft according to claim 1, further comprising an inlet and an outlet valve for letting gas in or out of the at least one additional balloon to enable the constant pressure in the inner balloon to be maintained.

17. Aircraft according to claim 1, wherein the gas circulating through the at least one insulating chamber includes a gas having a low thermal conductivity.

18. Aircraft according to claim 1, further comprising a connecting element that connects the platform to an underside of the outer balloon.

19. Aircraft according to claim 1, further comprising a coupling system that articulatingly and detachably couples the platform to the outer balloon.

20. Unmanned aircraft stationable at a pre-determined altitude in the stratosphere, consisting of:
- a platform for telecommunications equipment or scientific equipment,
- an outer balloon having an aerodynamic external shape at least when present in the stratosphere,
- a single pressurizable, inner balloon that contains gas, the outer and inner balloons supporting the platform, the inner balloon being arranged inside the outer balloon such that the outer balloon forms only a single insulating chamber around the inner balloon, an underside of the inner balloon being connected to an underside of the outer balloon,
- circulation means for circulating gas through the insulating chamber,
- at least one additional balloon arranged inside the inner balloon, the at least one additional balloon being attached on its underside to the inner balloon, an amount of gas in the at least one additional balloon being controlled to enable the inner balloon to be maintained at a constant pressure, and
- position maintaining means for maintaining the position of the platform with respect to the Earth.

* * * * *